No. 791,582. PATENTED JUNE 6, 1905.
R. E. RUSSELL.
AUTOMATIC STARTING DEVICE FOR VAPOR APPARATUS.
APPLICATION FILED MAR. 16, 1904.
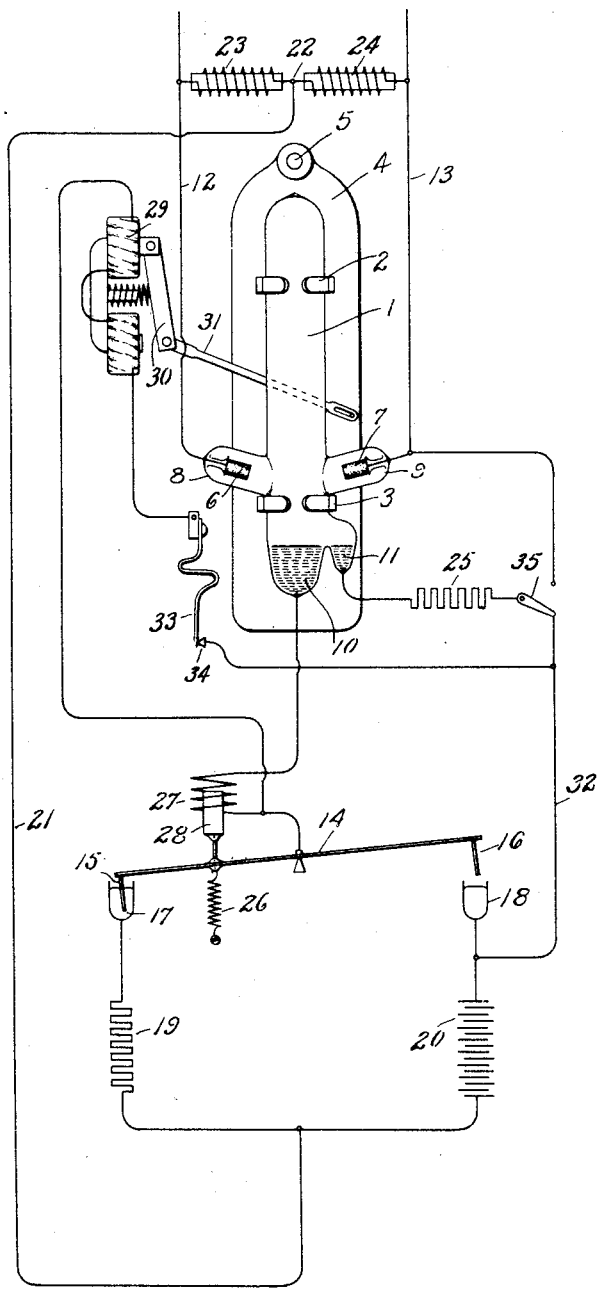
WITNESSES: INVENTOR:
Robert E. Russell,
By
Att'y.

No. 791,582.

Patented June 6, 1905.

UNITED STATES PATENT OFFICE.

ROBERT E. RUSSELL, OF SCHENECTADY, NEW YORK, ASSIGNOR TO GENERAL ELECTRIC COMPANY, A CORPORATION OF NEW YORK.

AUTOMATIC STARTING DEVICE FOR VAPOR APPARATUS.

SPECIFICATION forming part of Letters Patent No. 791,582, dated June 6, 1905.

Application filed March 16, 1904. Serial No. 198,528.

*To all whom it may concern:*

Be it known that I, ROBERT E. RUSSELL, a citizen of the United States, residing at Schenectady, county of Schenectady, State of New York, have invented certain new and useful Improvements in Automatic Starting Devices for Vapor Apparatus, of which the following is a specification.

My present invention is intended to provide for the automatic starting and control of vapor-rectifiers for charging storage batteries or the like.

In carrying my invention into practice I utilize direct current from the battery for starting the rectifier, and when the rectifier has been started I automatically shift the connections so that the rectifier then charges the battery.

One of the embodiments which may be taken as illustrative of my invention is shown in the accompanying drawing. The novel features of this and of other embodiments which come within the scope of my invention I have endeavored to point out with particularity in the appended claims.

In the particular embodiment shown the rectifier proper consists of a highly-exhausted glass envelop 1, mounted, by means of clips 2 and 3, upon a support 4, pivoted at 5 or at some other convenient point. The rectifier 1 is provided with positive electrodes or anodes 6 and 7, located, respectively, within lateral extensions 8 and 9 of the tube 1. A body of mercury 10 in the bottom of the tube constitutes a cathode, while an adjacent or separate body of mercury 11 operates as a starting-electrode. All of the electrodes are provided in the usual manner with suitable leading-in conductors for conveying current to or from the same. The anodes 6 and 7 are connected, respectively, to alternating-current leads 12 and 13. The cathode 10 is connected to a switch or contact-carrying arm 14. The contacts 15 and 16, carried thereby, are adapted to engage mercury-cups 17 and 18, connected, respectively, to a resistance 19 and a storage battery 20. The opposite ends of the resistance and the battery are connected together and to a lead 21, which extends to the junction 22 between two inductance-coils 23 and 24 in series across the alternating-current-supply leads 12 and 13. The remaining or starting electrode 11 is connected, preferably, through a current-limiting resistance 25 to the positive terminal of the battery 20. A spring or other device 26 holds the arm 14 in the position shown, wherein the resistance 19 is connected to the cathode 10. A solenoid 27 in series with the cathode operates upon a core 28, connected to the arm 14, so as to tilt the arm when the current is of sufficient value for the purpose.

In order to start the rectifier, the tube 1 may be shaken by hand, so as to cause a temporary flow of mercury over the barrier separating the electrodes 10 and 11. I prefer, however, to use an automatic shaking device which may be started into operation as soon as the battery is connected in the circuit for the purpose of charging. This shaking device consists of a magnet 29, having a spring-retracted armature 30, connected by a link 31 to the support 4. The coils of the magnet are connected in a circuit, one terminal of which goes to the lead 32 from the positive terminal of the battery and the other terminal to the arm 14, which in the starting position is electrically connected to the upper end of the resistance 19, as shown. Current thus flows from the battery through the coils of the magnet 29 and is limited in value by the resistance 19. The rectifier and its support is then swung until some part of the oscillating mechanism of the rectifier comes into engagement with the resilient member 33, which normally engages a fixed contact 34. The member 33 thus breaks the circuit of the magnet 29, whereupon the rectifier swings back, and the contacts 33 and 34 then come together and the operation is repeated. Oscillation of the rectifier thus produced causes mercury to flow between the electrodes 10 and 11, thus completing a circuit from the battery 20, to the electrode 11, to the cathode 10, and thence through the intervening circuit to the resistance 19 and back to the battery. As soon as there is a break in the mercury between these electrodes an arc starts, whereupon the electrode 10 is at once excited as a cathode. Unidirectional pulsations of current derived from the alternating-current source then immediately flow from the anodes 8 and 9 to the cathode 10 in a manner well understood by one skilled in the art, which pulsations complete their circuit through the resistance 19 and return-lead 21 to the inductance-coils 23 and 24. The solenoid 27 being thus energized by current of sufficient value from the cathode 10 then acts upon its core 28 and tips the arm 14, so that the contact 16 engages the mercury-cup 18, while the other contact 15 leaves the mercury-cup 17. The sequence of operations is such that the battery 20 is first connected in multiple with the resistance and the resistance then open-circuited. When the operation is completed, it will be noted that the electrodes 10 and 11 are practically short-circuited, thus putting out the starting-arc, and that the shaking-magnet 29 is also short-circuited. The rectifier being thus at rest and in normal operation, the battery 20 has its positive terminal connected to the negative electrode or cathode 10, and thus receives rectified current from the rectifier. The rectifier then continues to operate until some condition occurs which unduly reduces the amount of current flowing to the battery. When such a condition happens, the solenoid 27 weakens, so as to either throw the resistance in multiple with the battery or, if the weakening be excessive, to actually open-circuit the battery. The battery is thus prevented from causing a reverse flow of current through the rectifier, which might injure the rectifier. Such a condition might, for example, happen upon failure of current from the alternating-current source or for other reasons unnecessary to mention here.

Where a battery 20 or other source of direct current is not available for starting the rectifier, some other means for starting is of course necessary, and for this reason I provide a switch 35. This switch serves to shift the connections of the starting-electrode from the battery-circuit to one of the alternating-current leads—as, for example, the lead 13. When thus shifted, the starting-arc in the rectifier is produced by current from the alternating mains. As I have before stated, however, I prefer to use current from the battery to be charged, in case such a battery is available, since under these conditions the starting of the rectifier is easier and more certain than when current from the alternating-current mains is employed.

What I claim as new, and desire to secure by Letters Patent of the United States, is—

1. The combination of a vapor-rectifier having main electrodes and a starting-electrode, a storage battery, a resistance, and a starting and controlling switch for starting the rectifier through a local circuit including said resistance and battery and for then eliminating the resistance and placing the battery in the direct-current circuit of the rectifier.

2. The combination of a vapor-rectifier provided with main electrodes and a starting-electrode, means for causing a temporary electrical connection between the starting-electrode and one of the main electrodes, a storage battery, and a switch for connecting the battery first to the starting-electrode and then as soon as the rectifier starts connecting it to the coöperating main electrode.

3. The combination of a vapor electric apparatus for use with alternating current, a storage battery for starting the apparatus, and a switch operative when the apparatus starts for interrupting the starting-arc produced in the apparatus by said storage battery.

4. The combination of a vapor electric apparatus, an energy-storing device for producing a starting-arc in said apparatus, a switch for interrupting said arc, and means responsive to the starting of said apparatus for controlling said switch.

5. The combination of a vapor electric apparatus for use with alternating current, an energy-storing device for producing a starting-arc in said apparatus, a switch for interrupting said arc and connecting said device to receive current from said apparatus, and a magnet energized by current from said apparatus for controlling said switch.

In witness whereof I have hereunto set my hand this 14th day of March, 1904.

ROBERT E. RUSSELL.

Witnesses:
BENJAMIN B. HULL,
HELEN ORFORD.